(12) United States Patent
Horning et al.

(10) Patent No.: US 7,258,010 B2
(45) Date of Patent: Aug. 21, 2007

(54) MEMS DEVICE WITH THINNED COMB FINGERS

(75) Inventors: Robert D. Horning, Savage, MN (US); Mark W. Weber, Zimmerman, MN (US); Burgess R. Johnson, Bloomington, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/076,193

(22) Filed: Mar. 9, 2005

(65) Prior Publication Data

US 2006/0201249 A1    Sep. 14, 2006

(51) Int. Cl.
*G01P 15/125* (2006.01)
*G01P 9/04* (2006.01)

(52) U.S. Cl. ............................. 73/514.32; 73/504.14
(58) Field of Classification Search ............ 73/514.32, 73/514.36, 514.38, 514.29, 504.02, 504.04, 73/504.12, 504.14, 504.15, 514.16
See application file for complete search history.

(56) References Cited

U.S. PATENT DOCUMENTS

| | | | |
|---|---|---|---|
| 5,659,195 A | 8/1997 | Kaiser et al. | |
| 5,726,480 A | 3/1998 | Pister | |
| 5,894,091 A * | 4/1999 | Kubota | 73/504.12 |
| 5,992,233 A * | 11/1999 | Clark | 73/514.35 |
| 6,000,280 A | 12/1999 | Miller et al. | |
| 6,067,858 A | 5/2000 | Clark et al. | |
| 6,143,583 A | 11/2000 | Hays | |
| 6,232,546 B1 | 5/2001 | DiMatteo et al. | |
| 6,232,790 B1 | 5/2001 | Bryan et al. | |
| 6,250,156 B1 | 6/2001 | Seshia et al. | |
| 6,277,666 B1 | 8/2001 | Hays et al. | |
| 6,296,779 B1 | 10/2001 | Clark et al. | |
| 6,297,069 B1 | 10/2001 | Zapella et al. | |
| 6,388,789 B1 | 5/2002 | Bernstein | |
| 6,426,538 B1 | 7/2002 | Knowles | |
| 6,445,195 B1 | 9/2002 | Ward | |
| 6,487,864 B1 | 12/2002 | Platt et al. | |
| 6,498,996 B1 | 12/2002 | Vallot | |
| 6,516,666 B1 * | 2/2003 | Li | 73/504.12 |
| 6,544,655 B1 | 4/2003 | Cabuz et al. | |
| 6,548,321 B1 | 4/2003 | Sawyer | |

(Continued)

FOREIGN PATENT DOCUMENTS

EP    1411024    4/2004

(Continued)

OTHER PUBLICATIONS

Tsuchiya, Toshiyuki et al., "A z-axis differential capacitive SOI accelerometer with vertical comb electrodes", pp. 378-383, Feb. 20, 2004.*

(Continued)

*Primary Examiner*—Helen C. Kwok
(74) *Attorney, Agent, or Firm*—Gregory M. Taylor; Fogg & Powers LLC

(57) ABSTRACT

Methods of fabricating thinned comb MEMS devices are disclosed. A comb drive device in accordance with an illustrative embodiment of the present invention can include a number of interdigitated comb fingers some of which have a reduced thickness along at least a portion of their length relative to other comb fingers.

37 Claims, 11 Drawing Sheets

U.S. PATENT DOCUMENTS

| | | | |
|---|---|---|---|
| 6,577,929 B2 | 6/2003 | Johnson et al. | |
| 6,582,985 B2 | 6/2003 | Cabuz et al. | |
| 6,591,678 B2 * | 7/2003 | Sakai | 73/514.36 |
| 6,621,279 B2 | 9/2003 | Ward | |
| 6,639,289 B1 | 10/2003 | Hays | |
| 6,655,190 B2 | 12/2003 | Grossman et al. | |
| 6,668,111 B2 | 12/2003 | Tapalian et al. | |
| 6,674,294 B2 | 1/2004 | Ward | |
| 6,698,287 B2 | 3/2004 | Kubena et al. | |
| 6,915,693 B2 * | 7/2005 | Kim et al. | 73/504.12 |
| 7,013,730 B2 * | 3/2006 | Malametz | 73/514.36 |
| 2002/0023424 A1 | 2/2002 | Takamatsu et al. | |
| 2002/0171901 A1 | 11/2002 | Bernstein | |
| 2002/0190607 A1 | 12/2002 | Paden et al. | |
| 2003/0034870 A1 | 2/2003 | Becka et al. | |
| 2003/0036214 A1 | 2/2003 | Eskridge | |
| 2003/0080648 A1 | 5/2003 | Jerman et al. | |
| 2003/0106372 A1 | 6/2003 | Adams et al. | |
| 2003/0107317 A1 | 6/2003 | Touchberry et al. | |
| 2003/0160021 A1 | 8/2003 | Platt et al. | |
| 2003/0164042 A1 | 9/2003 | Valentin | |
| 2003/0167842 A1 | 9/2003 | Platt | |
| 2003/0183006 A1 | 10/2003 | Platt et al. | |
| 2003/0196491 A1 | 10/2003 | Platt | |
| 2003/0200785 A1 | 10/2003 | Platt | |
| 2003/0200803 A1 | 10/2003 | Platt | |

FOREIGN PATENT DOCUMENTS

| | | | |
|---|---|---|---|
| FR | 2865201 | | 7/2005 |
| JP | 05076186 | | 6/1991 |
| JP | 08-166405 | * | 6/1996 |
| WO | 9637784 | | 11/1996 |
| WO | 2005028359 | | 5/2005 |

OTHER PUBLICATIONS

Takahiro Sato et al.; "Investigation of Two-Level Split Finger Transducers"; IEEE Ultrasonics Symposium, pp. 351-356, 2002.*

Geiger W et al., "New designs of micromachined vibrating rate gyroscopes with decoupled oscillation modes", Sensors and Actuators A, Elsevier Sequoia S.A., Lausanne, CH vol. 66, No. 1-3, Apr. 1, 1998, pp. 118-124, XP0004143979, ISSN: 0924-4247.

* cited by examiner

MEMS DEVICE WITH THINNED COMB FINGERS

FIELD OF THE INVENTION

The present invention relates generally to the field of semiconductor manufacturing and microelectromechanical systems (MEMS). More specifically, the present invention relates to MEMS devices that have comb drives and/or sense fingers.

BACKGROUND

Electrostatic comb drive devices are utilized to provide motion in microelectromechanical systems (MEMS) devices. Such drive devices are employed, for example, in the fabrication of MEMS-type accelerometers, gyroscopes, and inertia sensing devices where rapid actuation is often necessary to effectively detect and measure motion and/or acceleration, or in the design or where size and/or weight are important design considerations. In the design of navigational and communications systems, for example, such devices are useful in measuring and/or detecting slight variations in linear and rotational motion of an object traveling through space. Other applications employing drive systems such as Steered Agile Beam (STAB) modules may also use electrostatic comb drive devices to provide a more precise alignment and orientation control of structures such as MEMS micro-mirrors and/or lenses.

In a typical comb drive device, a proof mass is supported over an underlying support substrate using a number of suspension beams or springs. The proof mass typically includes a number of drive elements that can be used to electrostatically move the proof mass above the support substrate in a particular manner. In certain designs, for example, the drive elements can include a number of interdigitated comb fingers spaced apart from each other by a relatively small gap (e.g. 1 to 2 microns), forming an overlapping region between adjacent comb fingers. During operation, an electrical charge can be applied to the comb fingers to induce an electrostatic charge between each overlapping region, converting electrical energy into mechanical energy. By varying the voltage signal applied, the proof mass can be configured to electrostatically oscillate back and forth in a desired manner, allowing one or more sense electrodes to measure up/down displacement of the proof mass induced by movement of the device about a rate axis.

In one illustrative embodiment, fabrication of electrostatic comb drive devices may begin with a silicon wafer substrate. In one embodiment, a boron-doped epitaxial (p++) layer is grown over the wafer substrate, which can then be patterned to form the desired microstructures using photolithography and etching techniques. The etched layer may be then bonded to an underlying support substrate (i.e. a "handle wafer") using a suitable bonding process such as anodic bonding. The support substrate may include a number of mesas that support the proof mass and drive elements above the support substrate while allowing movement thereon. After bonding, the silicon substrate can be removed using a boron-selective etchant, leaving only the patterned p++ silicon mechanism bonded to the handle wafer. A number of suspension beams, springs, or other flexural elements are also typically used to constrain motion of the proof mass in a particular direction above the support substrate.

During fabrication, stresses induced between the epitaxial layer and wafer substrate, as well as fabrication imperfections, can result in imperfect alignment of the comb fingers, flexural elements, as well as other components, causing the proof mass to oscillate back and forth in a non-ideal manner above the support substrate. In certain applications, for example, such stresses and fabrication imperfections can cause uniform disengagement or shifting of the movable comb fingers with respect to the stationary comb fingers. In some applications, such stresses and fabrication imperfections can also cause the comb fingers to curve or bow slightly, resulting in a non-uniform disengagement of the comb fingers. During actuation, such shifting and/or bowing can induce electric fields both in the plane and perpendicular to the drive axis of the proof mass. As a result, an undesired out-of-plane electrical and/or mechanical component is introduced into the drive system, causing errors in the output signal that can reduce the ability of the device to measure subtle changes in movement.

SUMMARY

The present invention relates to MEMS devices that include comb drive and/or sense fingers. A comb drive device in accordance with an illustrative embodiment of the present invention includes a first plurality of comb fingers spaced apart from and interdigitated with a second plurality of comb fingers. The first plurality of comb fingers can be fixed in place, and is thus unable to move. The second plurality of comb fingers, in turn, can be attached to a moving portion of the structure, and moves with respect to the first plurality of comb fingers. Each of the first and second plurality of comb fingers can include a top portion, a bottom portion, and a thickness defined by the top and bottom portions. In certain embodiments, the thickness of at least a portion of the second plurality of comb fingers is less than the thickness of the first plurality of comb fingers. During actuation, the reduced thickness of the second plurality of comb fingers can be used to reduce or prevent the formation of fringe electric fields at the top and bottom portions of the comb fingers, which can cause the comb fingers to move out-of-plane under certain circumstances.

An illustrative method of fabricating such a thinned comb MEMS device of the present invention can include the steps of providing a wafer substrate having a first surface and a second surface, forming a layer over the first surface of the wafer substrate, forming a number of shallow trenches in a first surface of the layer, bonding the wafer substrate and partially etched layer to a handle wafer, removing the wafer substrate from the layer, forming a second number of shallow trenches in a second surface of the layer, and then patterning a portion of the layer leaving intact the first and second number of shallow trenches to form one or more thinned comb fingers of the device. In certain embodiments, a metal layer may be formed over the first number of shallow trenches, which, during subsequent etching steps, can be used as an etch stop to help prevent etchant from further etching the thinned down portions of the comb fingers. Other methods are also contemplated and disclosed.

DETAILED DESCRIPTION

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials are illustrated for the various elements, those skilled in the art will recognize that many of the examples provided have suitable alternatives that may be utilized. Moreover, while the various drawings illustrated are described with respect to MEMS gyroscopes, it should be understood that the various devices and methods herein could be used in other MEMS devices employing drive systems.

Figure 1:
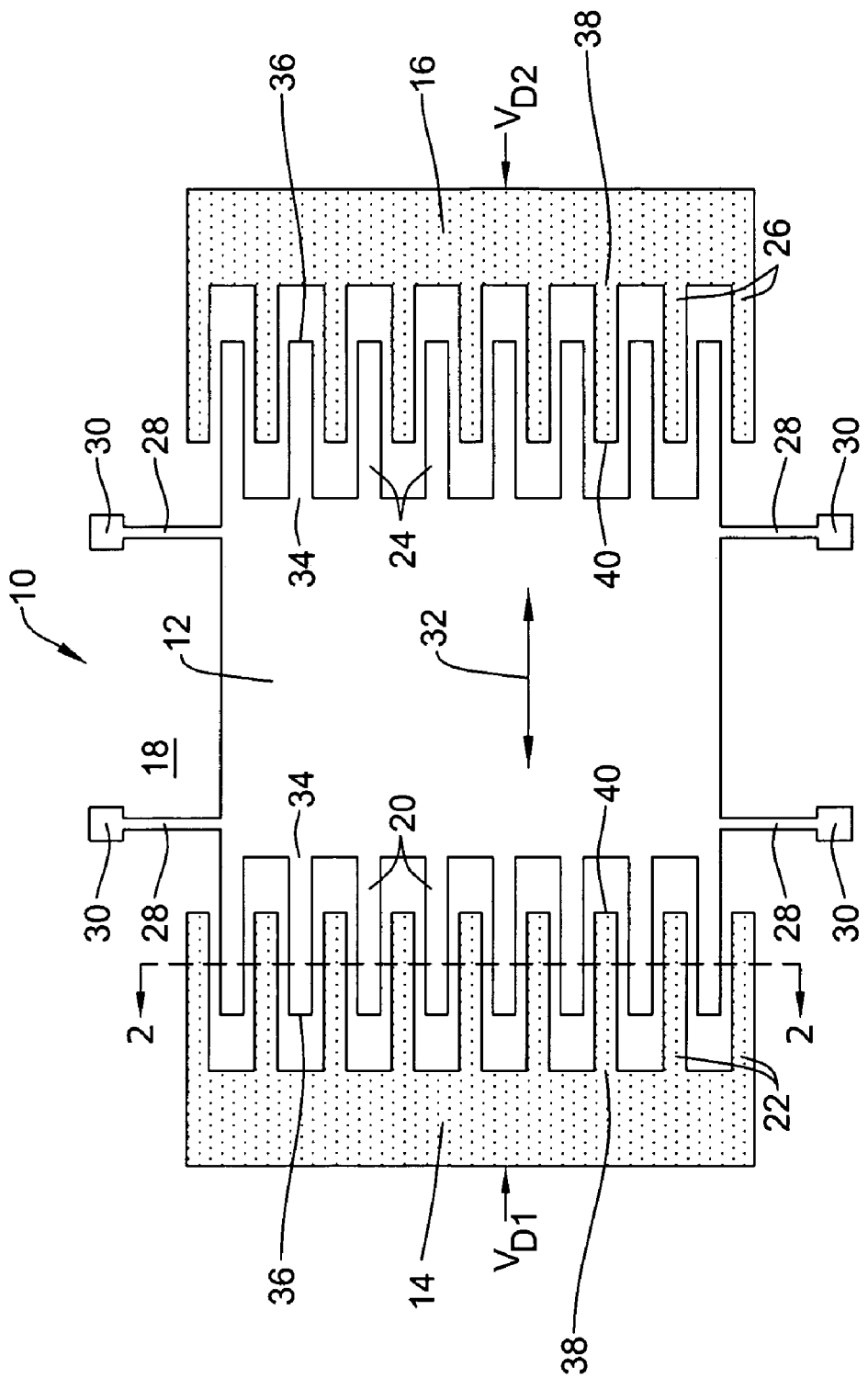
FIG. 1 is a schematic view of an illustrative prior-art electrostatic comb drive device including a number of interdigitated comb drive elements.

FIG. 1 is a schematic view of an illustrative prior-art electrostatic comb drive device 10 including a number of comb drive elements. Comb drive device 10, illustratively a linear-type comb drive device, includes a proof mass 12 adapted to oscillate back and forth between a first comb drive member 14 and a second comb drive member 16 each formed in an opposing manner over an underlying support substrate 18. While the discussion contained herein refers specifically to comb drive elements, it should be appreciated that other comb elements can employ one or more features described herein. In certain embodiments, for example, such comb elements can also be used as comb sense elements for sensing, and/or for other desired purposes.

The proof mass 12 can include a first set of comb fingers 20 that are interdigitated with a number of comb fingers 22 coupled to the first comb drive member 14. In similar fashion, the proof mass 12 can include a second set of comb fingers 24 that are interdigitated with a number of comb fingers 26 coupled to the second comb drive member 16.

During electrostatic actuation, the first and second comb drive members 14,16 are configured to remain stationary above the support substrate 18. The proof mass 12, in turn, is freely suspended above the support substrate 18, and can be configured to move back and forth in a reciprocating manner between the first and second comb drive members 14,16. One or more suspension beams 28 each equipped with a corresponding attachment pad 30 can be provided to anchor the proof mass 12 to the support substrate 18. In use, each suspension beam 28 provides a mechanical restoring force to the proof mass 12 when the proof mass 12 moves away from its rest position.

An external drive voltage source $V_D$ having leads coupled to the first and second comb drive members 14,16 can be configured to electrically charge the stationary comb fingers 22,26, inducing an electrostatic force between each corresponding set of interdigitated comb fingers 20,22 and 24,26 that causes the proof mass 12 to move back and forth in a drive axis indicated generally by arrow 32. The drive voltage source $V_D$ can be configured to output a time-varying voltage signal to alternate the charge delivered to the comb drive members 14,16, which in conjunction with the one or more suspension springs 28, causes the proof mass 12 to oscillate back and forth in a particular manner above the support substrate 18.

As can be further seen in FIG. 1, the comb fingers 20,24 coupled to each side of the proof mass 12 may extend longitudinally from a base portion 34 of each comb finger 20,24 to an end portion 36 thereof. In similar fashion, the comb fingers 22,26 coupled to the first and second comb drive members 14,16 may each extend longitudinally from a base portion 38 of each comb finger 22,26 to an end portion 40 thereof. In the illustrative prior art electrostatic comb drive device depicted in FIG. 1, each corresponding set of interdigitated comb fingers 20,22 and 24,26 are aligned in a parallel manner, and are configured to move longitudinally with respect to each other when energized via the drive voltage source $V_D$.

Figure 2:
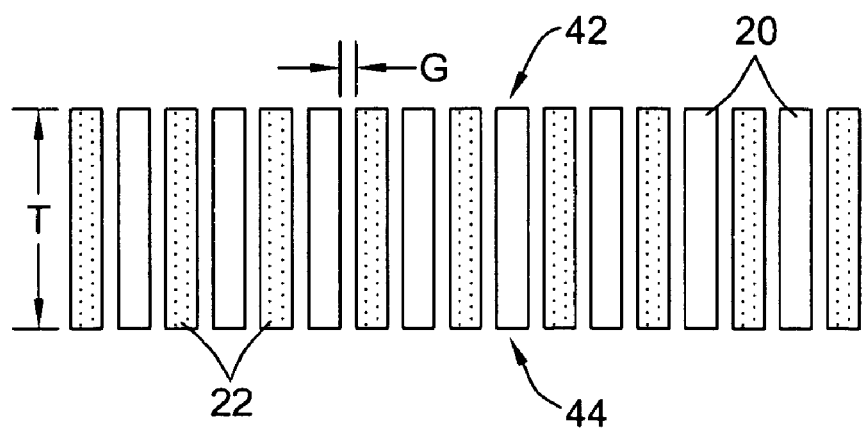
FIG. 2 is a cross-sectional view showing the profile of the interdigitated comb fingers along line 2-2 of FIG. 1, wherein the comb fingers are shown having an idealized structure.

FIG. 2 is a cross-sectional view of interdigitated comb fingers 20,22 along line 2-2 of FIG. 1, wherein the comb fingers 20,22 are shown having an idealized structure. In the idealized configuration depicted in FIG. 2, each of the comb fingers 20,22 are shown having a uniform thickness T extending between a top portion 42 and bottom portion 44 of each comb finger 20,22. A small gap G (e.g. 1 to 2 microns) between each overlapping comb finger 20,22 permits a charge applied to the stationary comb fingers 22 to electrostatically attract the moving comb fingers 20, causing the proof mass 12 to move horizontally in the direction of the drive axis. A similar configuration can be provided for the opposite set of interdigitated comb fingers 24,26, but with an electrostatic force applied 180° out-of-phase to permit the comb fingers 24,26 to operate in opposition to the comb fingers 20,22.

Figure 3:
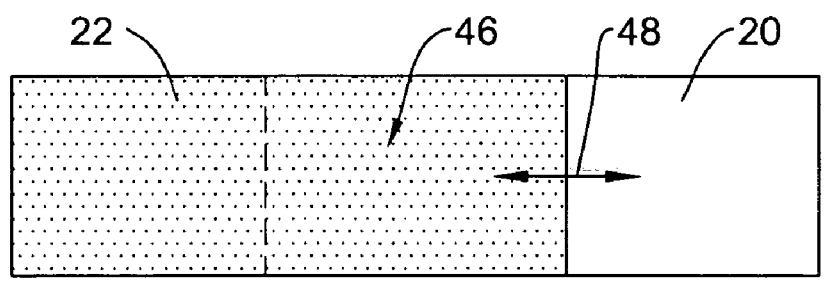
FIG. 3 is a side view showing movement of the idealized comb fingers of FIG. 2.

FIG. 3 is a side view showing movement of the idealized comb fingers 20,22 of FIG. 2 in greater detail. As can be seen in FIG. 3, each adjacent comb finger 20,22 may define an overlapping capacitive region 46, which as is described above with respect to FIG. 2, can be spaced apart from each other by a gap G. During actuation, and as indicated generally by arrow 48, the idealized comb fingers 20,22 are adapted to move in only a horizontal direction, having no component of motion in the vertical direction. In this situation, the amount of overlap at the overlapping region 46 varies in proportion to the movement of the comb fingers 20,22 in a direction along the drive axis 32.

Figure 4:
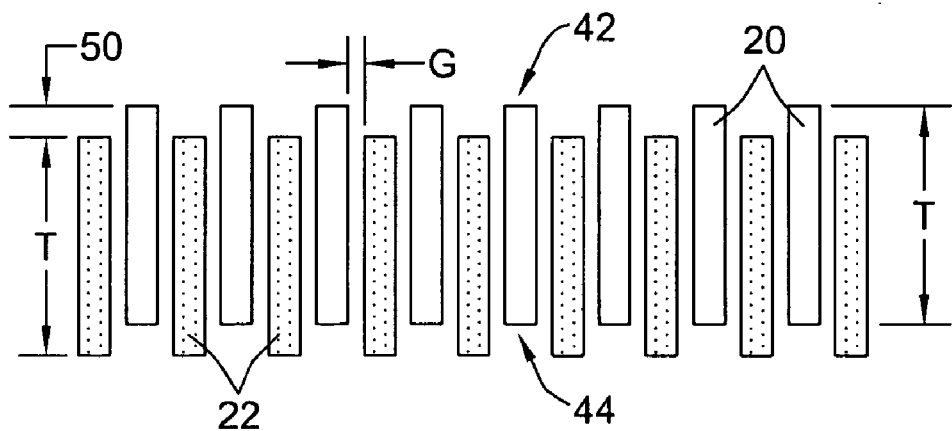
FIG. 4 is a cross-sectional view showing the profile of the interdigitated comb fingers along line 2-2 of FIG. 1, wherein the comb fingers are shown having a uniformly disengaged profile.

FIG. 4 is a cross-sectional view showing the profile of the interdigitated comb fingers 20,22 along line 2-2 of FIG. 1, wherein the comb fingers 20,22 are shown having a uniformly disengaged structure. As with the idealized comb fingers 20,22 depicted in FIG. 2, each of the disengaged comb fingers 20,22 have a uniform thickness T extending between a top portion 42 and a bottom portion 44 of each comb finger 20,22. Due to stresses and other irregularities induced during the fabrication process, however, the moving comb fingers 20 are shown offset or shifted vertically a distance 50 from the stationary comb fingers 22. Such offset or shifting may occur, for example, due to the introduction of stresses in the epitaxial (or other device) layer used to form the various comb drive elements.

Figure 5:
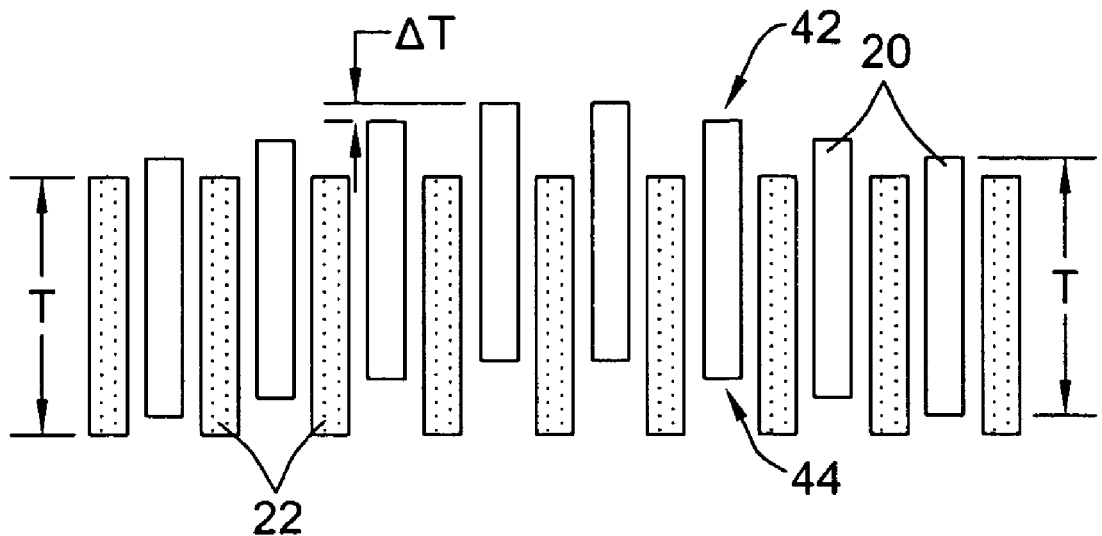
FIG. 5 is a cross-sectional view showing the profile of the interdigitated comb fingers along line 2-2 of FIG. 1, wherein the comb fingers are shown having a non-uniformly disengaged profile.

FIG. 5 is another cross-sectional view showing the interdigitated comb fingers along line 2-2 of FIG. 1, wherein the comb fingers 20,22 are shown having a non-uniformly disengaged profile. As with the comb fingers 20,22 depicted in FIG. 4, the comb fingers 20,22 can have a uniform thickness T extending between a top portion 42 and bottom portion 44 of each comb finger 20,22, and can be offset or shifted with respect to each other. In FIG. 5, however, the moving comb fingers 20 are further shown having a bow or curvature with the vertical distance ΔT between each adjacent comb finger 20 varying slightly. The bow or curvature can be oriented in a vertically upward direction as shown, for example, in FIG. 5, or in a vertically downward direction.

Figure 6:
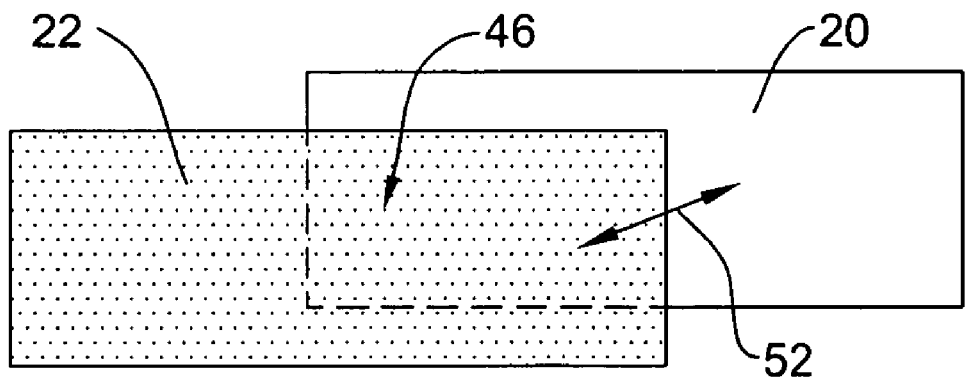
FIG. 6 is a side view showing movement of the disengaged comb fingers of FIGS. 4-5.

FIG. 6 is a side view showing movement of the disengaged comb fingers 20,22 of FIGS. 4-5. As can be seen in FIG. 6, irregularities induced during the fabrication process can cause offsets in the comb drive device, causing the moving comb fingers 20 to move in the direction indicated, for example, by arrow 52. This motion out of plane results in the moving comb fingers 20 having both a desired horizontal component of motion in the direction of the drive axis and an undesired vertical component of motion perpendicular to the direction of the drive axis. In some applications, for example, such motion both in the plane and perpendicular to the plane of the proof mass 12 can introduce an undesired drive signal component or an undesired sensing signal component that can lead to errors in the output signal of the device. The disengagement of the comb fingers 20,22 at the overlapping region 46 need only be a small fraction of the comb finger 20,22 thickness for such errors to be prevalent. To compensate for these irregularities in the drive system, many prior-art designs have focused on methods and techniques for suppressing or compensating the undesired drive or sensing signal using complicated error-correction techniques in the drive system and/or sensing system.

Figure 7:
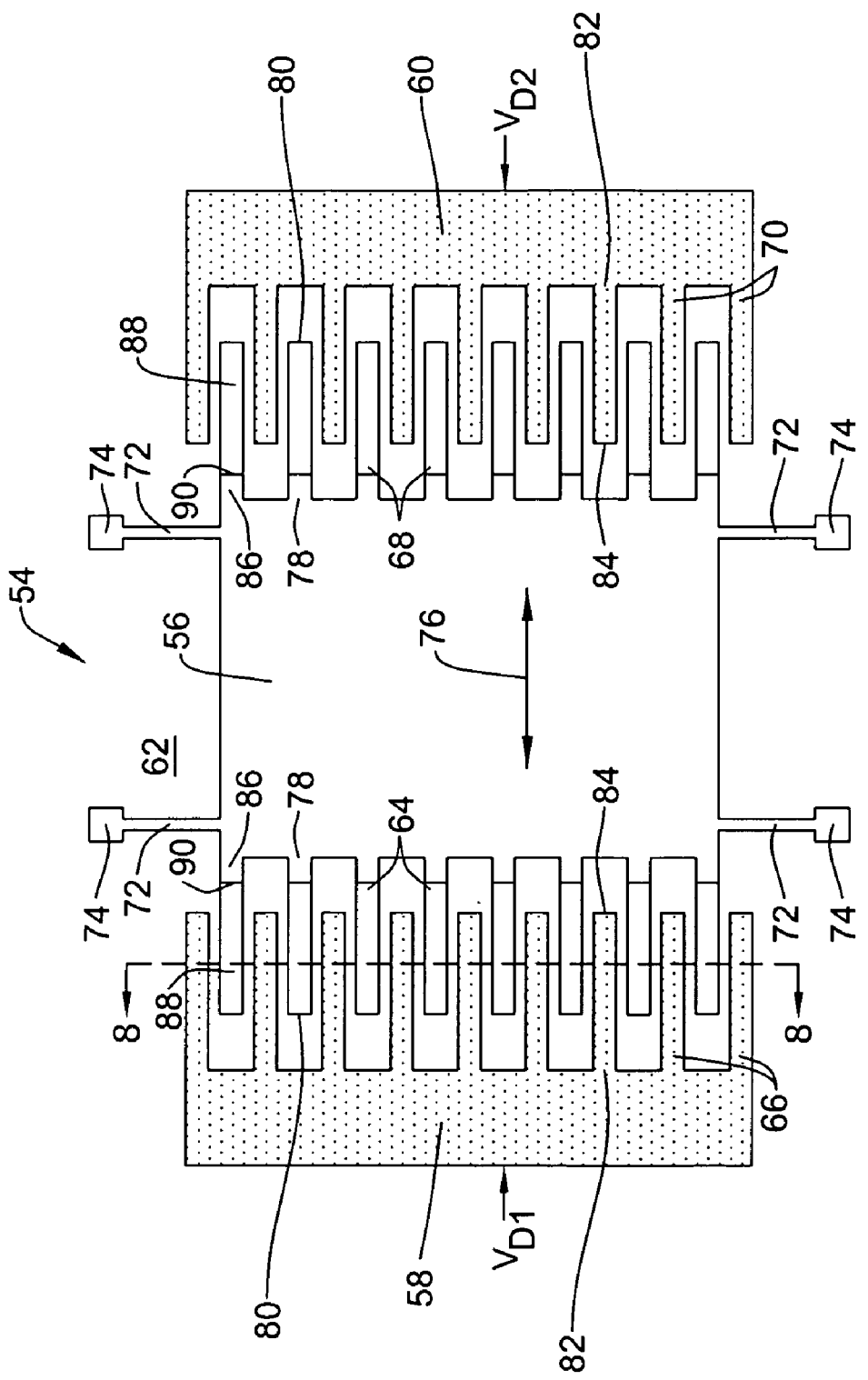
FIG. 7 is a schematic view of an electrostatic comb drive device in accordance with an illustrative embodiment having a number of thinned comb fingers.

Turning now to FIG. 7, a comb drive device 54 in accordance with an illustrative embodiment of the present invention having thinned comb fingers will now be described. Comb drive device 54 may have a structure similar to that described above with respect to FIG. 1, including a proof mass 56 adapted to oscillate back and forth between a first comb drive member 58 and a second comb drive member 60 each formed in an opposing manner over an underlying support substrate 62 such as a glass handle wafer or the like. While a glass support substrate 16 may be used, it is contemplated that the support substrate can be made from any number of suitable materials.

The proof mass 56 can include a first set of comb fingers 64 that are interdigitated with a number of comb fingers 66 coupled to the first comb drive member 58. In similar fashion, the proof mass 56 can include a second set of comb fingers 68 (or a third set, fourth set, etc.) that are interdigitated with a number of comb fingers 70 coupled to the second comb drive member 60. While in the particular view depicted in FIG. 7 the comb drive device 54 is shown having only a single proof mass structure that oscillates above the support substrate 62, it should be understood that the comb drive device 54 can include multiple drive structures, if desired.

During electrostatic actuation, the first and second comb drive members 58,60 can be configured to remain stationary above the support substrate 62. The proof mass 56, in turn, can be freely suspended above the support substrate 62 and configured to move back and forth in a reciprocating manner between the first and second comb drive members 58,60. One or more suspension beams 72 each equipped with a corresponding attachment pad 74 can be provided to anchor the proof mass 56 to the support substrate 62. In use, each suspension beam 72 can be used to provide a mechanical restoring force to the proof mass 56 when the proof mass 56 moves away from its rest position. While suspension beams 72 are specifically depicted in the illustrative embodiment of FIG. 7, it should be understood that other suitable flexural elements could be used.

An external drive voltage source $V_D$ having leads coupled to the first and second comb drive members 58,60 can be configured to electrically charge the stationary comb fingers 66,70, inducing an electrostatic force between each corresponding set of interdigitated comb fingers 64,66 and 68,70 that causes the proof mass 56 to move back and forth in a drive axis indicated generally by reference to arrow 76. The drive voltage source $V_D$ can be configured to output a time-varying voltage signal to alternate the charge delivered to the comb drive members 58,60, which in conjunction with the one or more suspension beams 72, causes the proof mass 56 to oscillate back and forth in a particular manner above the support substrate 62.

The comb fingers 64,68 coupled to each side of the proof mass 56 may extend longitudinally from a base portion 78 of each comb finger 64,68 to an end portion 80 thereof. In similar fashion, the comb fingers 66,70 coupled to the first and second comb drive members 58,60 may each extend longitudinally from a base portion 82 of each comb finger 66,70 to an end portion 84 thereof. As with the electrostatic comb drive device 10 described above with respect to FIG. 1, each corresponding set of interdigitated comb fingers 64,66 and 68,70 can be aligned in a parallel manner, and can be configured to move longitudinally with respect to each other when energized via the drive voltage source $V_D$. Although a linear comb drive device 54 is specifically depicted in the illustrative embodiment of FIG. 7, it should be understood that the comb drive device 54 can comprise a rotary-type comb drive device or other such device, as desired.

The comb fingers 64,68 coupled to the proof mass 56 can be thinned relative to the comb fingers 66,70 coupled to the stationary comb drive members 58,60, or vice versa. The comb fingers 64,68 can be thinned down along all or a portion of their length. As shown in FIG. 7, for example, each of the moving comb fingers 64,68 can transition in thickness from a first region 86 extending from the base portion 78 of each comb finger 64,68 to a second region 88 wherein the thickness of each comb finger 64,68 is reduced. The thickness of each thinned comb finger 64,68 can transition abruptly at transition 90, or can gradually taper in thickness, if desired. Moreover, while the comb fingers 64,68 may have a substantially uniform thickness along the length of each respective region 86,88, it should be understood that the comb finger 64,68 could assume other shapes, as desired. Some illustrative methods of fabricating a comb drive device having thinned comb fingers are described herein with respect to FIGS. 11A-11K and FIGS. 12A-12I.

While in the illustrative embodiment of FIG. 7 the moving comb fingers 64,68 are thinned along at least a portion of their length, other embodiments have been envisioned where the stationary comb fingers 66,70 are reduced in thickness relative to the moving comb fingers 64,68. In certain embodiments, for example, the stationary comb fingers 66,70 may transition in thickness from a relatively thick region at or near the base 82 of each comb finger 66,70 to a relatively thin region towards the end portion 84 thereof. As with other embodiments herein, the stationary comb fingers 66,70 could be reduced in thickness along all or a portion of their length, and can transition either abruptly or gradually (if at all).

Figure 8:
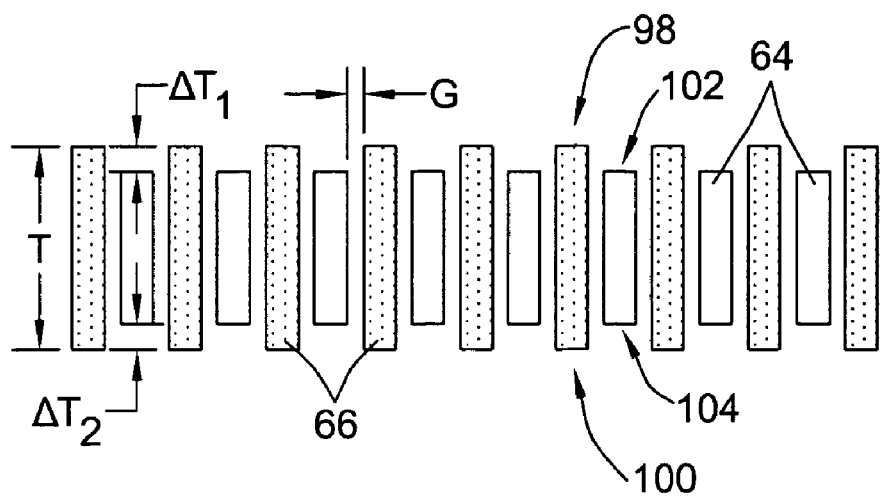
FIG. 8 is a cross-sectional view showing the profile of the interdigitated comb fingers along line 8-8 of FIG. 7.

FIG. 8 is a cross-sectional view showing the profile of the interdigitated comb fingers 64,66 along line 8-8 of FIG. 7. As can be seen in FIG. 8, the stationary comb fingers 66 can have a uniform thickness T extending between a top portion 98 and bottom portion 100 of each comb finger 66, similar to the comb fingers 22 described above with respect to FIG. 4. The moving comb fingers 64, in turn, can have a reduced thickness wherein the top portion 102 and bottom portion 104 of the moving comb fingers 64 are reduced in thickness by an amount $\Delta T_1$ and $\Delta T_2$, respectively, relative to the top and bottom portions 98,100 of the stationary comb fingers 66. In certain embodiments, the changes in thickness (i.e. $\Delta T_1$ and $\Delta T_2$) can be similar to or greater than the gap G between each adjacent comb finger 64,66. During actuation, the top and bottom portions 102,104 of the moving comb fingers 64 can be located vertically within the boundaries formed by the top and bottom portions 98,100 of the stationary comb fingers 66, thus reducing or preventing the formation of fringe electric fields that extend beyond the top and bottom portions 98,100 of the stationary comb fingers 66. A similar configuration can be provided on the opposite set of interdigitated comb fingers 68,70, if desired.

Figure 9:
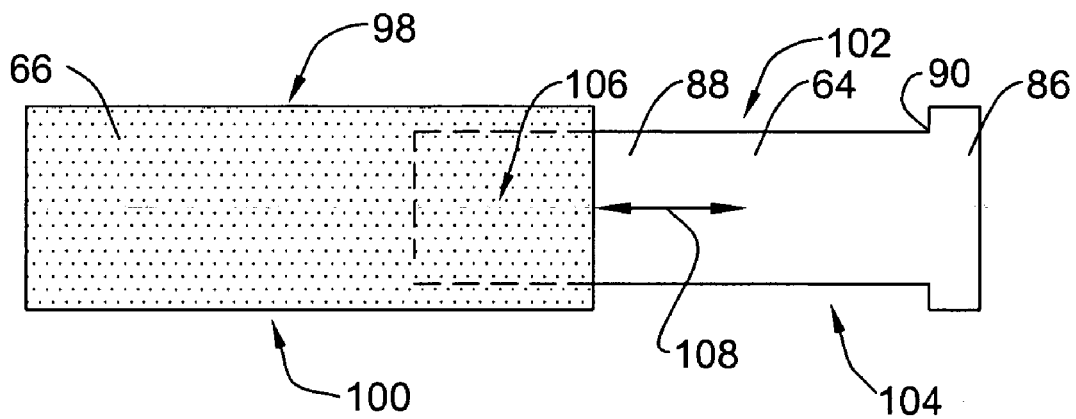
FIGS. 9-10 are side views showing movement of the comb fingers of FIG. 8 between two illustrative positions within an actuation cycle.
Figure 10:
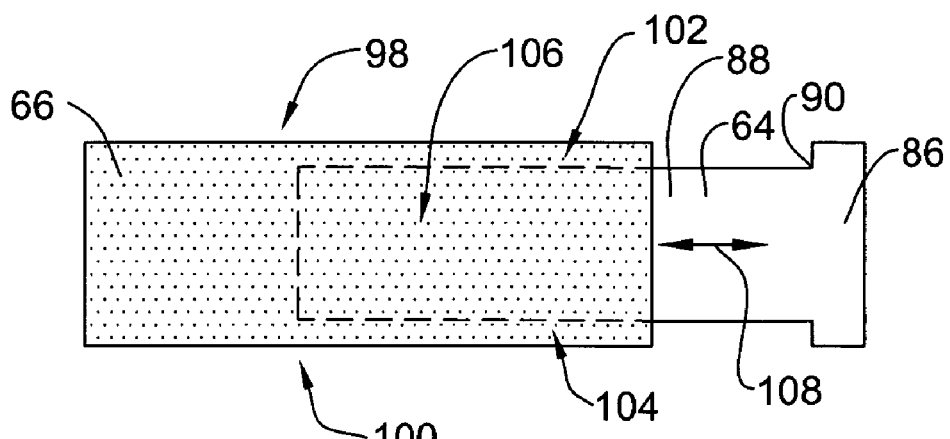

FIGS. 9-10 are side views showing the movement of the interdigitated comb fingers 64,66 between two illustrative positions within an actuation cycle. As the moving comb fingers 64 move back and forth between a recoiled position (FIG. 9) and an attracted position (FIG. 10), the top and bottom portions 102,104 of the moving comb fingers 88 remains within the vertical boundaries formed by the top and bottom portions 98,100 of the stationary comb fingers 66. This arrangement results in a more uniform electric field around the overlapping region 106 of the comb fingers 64,66, causing the moving comb fingers 64 to move back and forth in the direction indicated generally by arrow 108 (i.e. parallel with the proof mass 56), with little or no vertical component. If the moving comb fingers 64 are thinned sufficiently (e.g. by an amount greater than the amount of disengagement), then the fringing electrical fields around the moving comb fingers 64 will be significantly reduced in those situations where the comb fingers 64 are vertically disengaged. This allows the comb drive device 54 to function at a greater sensitivity and/or with less error correction than prior-art designs. Thinned combs may also provide a benefit when the comb fingers are used to sense motion and/or position, such as the motion and/or position of the proof mass, because vertical motion of the moving comb fingers 64 will not produce a corresponding electric current component. Thus, any motion and/or position sense signal taken from the comb fingers will not be as sensitive to vertical motion of the moving comb fingers 64.

FIGS. 11A-11J are schematic views of an illustrative method 110 of fabricating a thin comb MEMS device in accordance with an illustrative embodiment of the present invention. Beginning with FIG. 11 A, a glass handle wafer 112 is provided, which as described in greater detail below, can be used to form the underlying supporting substrate of the comb drive device (e.g. support substrate 62). The glass handle wafer 112 can have a first surface 114 and a substantially coplanar second surface 116. The glass handle wafer can be formed from a suitable material such as a Pyrex Coming Type No. 7740. Other materials such as silicon could also be used in certain embodiments, if desired.

Figure 11A:
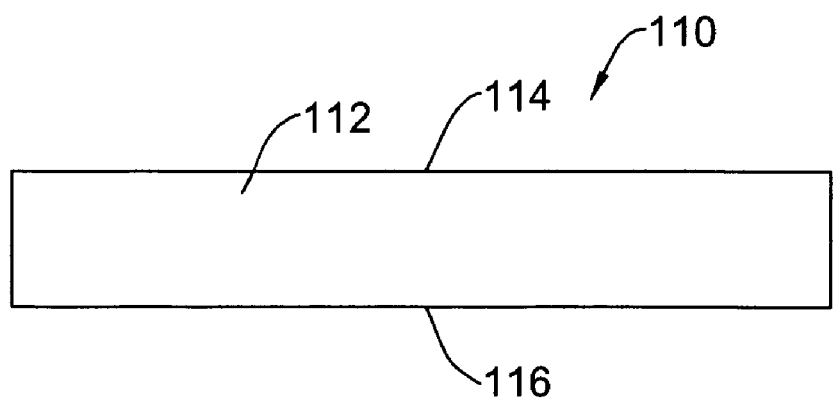
FIGS. 11A-11J are schematic representations of a method of fabricating a thin comb MEMS device in accordance with an illustrative embodiment of the present invention.
Figure 11B:
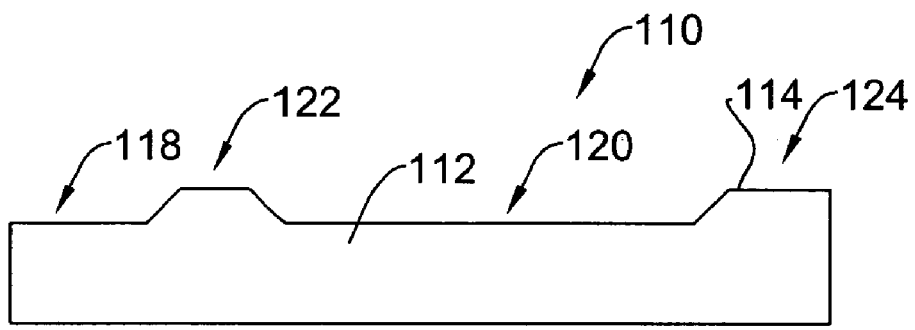

In FIG. 11B, the glass handle wafer 112 is shown after a subsequent step of etching the first surface 114 to form one or more recesses 118,120 and mesas 122,124. In some embodiments, the recesses 118,120 formed in the top surface 114 of the glass handle wafer 112 can be used to form a capacitive gap for the detection of displacement of the overlying proof mass. The mesas 122,124, in turn, can be used to provide support for the comb drive members (e.g. comb drive members 58,60) as well as other components of the device. Etching of the first surface 114 of the glass wafer handle 112 can be accomplished using standard etching techniques well known to those of skill in the art.

In certain embodiments, the mesas 122,124 can be formed by etching away a portion of the top surface 114 of the glass handle wafer 112, leaving intact the material at the mesas 122,124. In other embodiments, the mesas 122,124 can be formed by building up material from the top surface 114 of the glass handle wafer 112. In either embodiment, the mesas 122,124 can be configured to support the comb drive elements above the top surface 114 in a manner that permits freedom of movement of the proof mass.

Figure 11C:
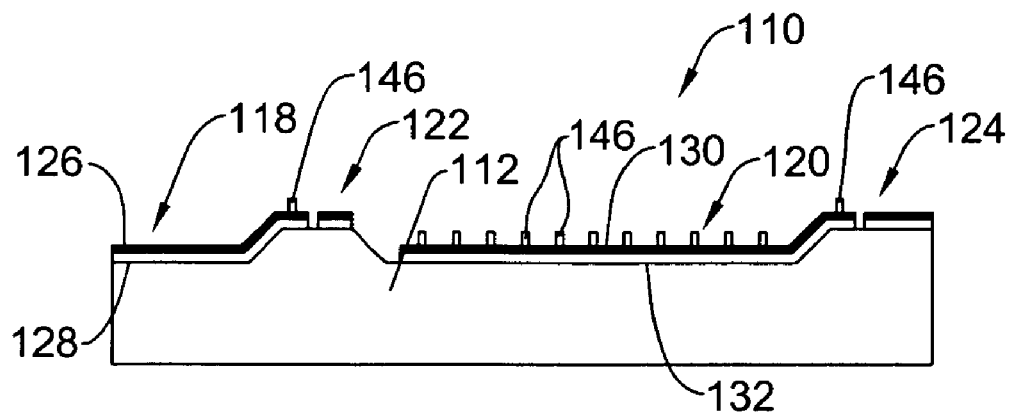
Figure 11D:
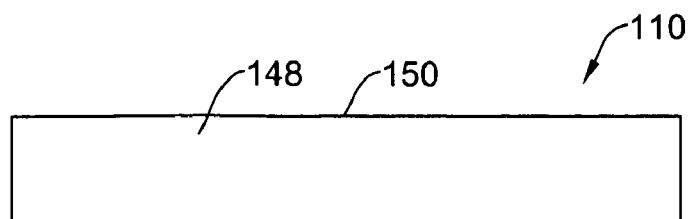

Once the recesses 118,120 and mesas 122,124 are formed on the glass handle wafer 112, a metal pattern can then be formed on all or a portion of the etched top surface 114, providing conductive traces for various components of the device (e.g. sense electrode, ground planes, etc.). As shown in FIG. 11C, for example, the metal pattern can include a first conductive trace 126 formed on a first recessed surface 128, and a second conductive trace 130 formed on a second recessed surface 132 of the glass handle wafer 112. Other features such as the bumples 146 depicted in FIG. 11C may also be provided at one or more locations of the glass handle wafer 112, if desired.

FIGS. 11D-11J illustrate the steps of forming the comb drive elements using a sacrificial wafer and epitaxial layer. Beginning with FIG. 11D, a wafer 148 having a first surface 150 and a second surface 152 can be provided as a sacrificial substrate. The wafer 148 can be formed from any number of suitable materials capable of being etching using semiconductor fabrication techniques such as micromasking. While a silicon wafer is typically the most common wafer material used, it will be appreciated by those of skill in the art that other suitable materials can also be employed, if desired.

Figure 11E:
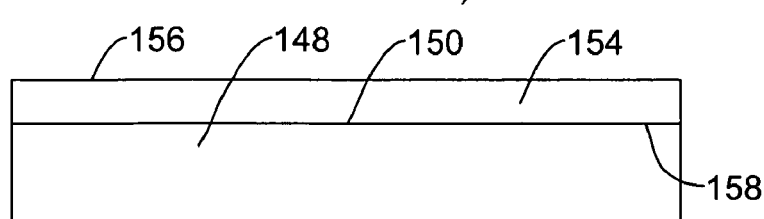

As shown in a subsequent step in FIG. 11E, an epitaxial ("epi") layer 154 having a first surface 156 and a second surface 158 can be grown over the first surface 150 of the wafer 148, which can then be later removed through a series of etching processes as described herein. In some embodiments, for example, building of the epitaxial layer 154 can include the use of an epitaxially grown single-crystal silicon layer heavily doped with boron. Other dopants such as gallium, phosphorus, and arsenic may also be used to form the epitaxial layer 154 in those embodiments utilizing alternative processes such as SOI or a transferred layer process. In some cases, the dopant contained in the epitaxial layer 154 can be used as an etch stop in later fabrication steps to facilitate removal of the wafer 148, leaving intact only the relatively thin epitaxial layer 154 forming the various elements of the comb drive device.

Rather than using an epitaxial layer as described above, in some illustrative embodiments an SOI (Silicon-On-Insulator) wafer may be used, and the thin silicon layer that is disposed on the insulating layer of the SOI wafer may be patterned to form the desired microstructures using photolithography and etching techniques. In some cases, the thicker silicon substrate and insulating layer of the SOI wafer may be subsequently removed to release the thinner silicon layer either before or after patterning. In yet another illustrative embodiment, a thinned silicon wafer may be used. The thinned silicon wafer may be patterned to form the desired microstructures using photolithography and etching techniques. In this illustrative embodiment, a thicker silicon starting wafer may be thinned down to a desired thickness. The thinned silicon wafer is sometimes referred to as a transfer layer. While these and other techniques may be used to form the desired microstructures, the illustrative embodiment that employs a boron-doped epitaxial (p++) layer will be described hereafter for illustrative purposes.

Figure 11F:
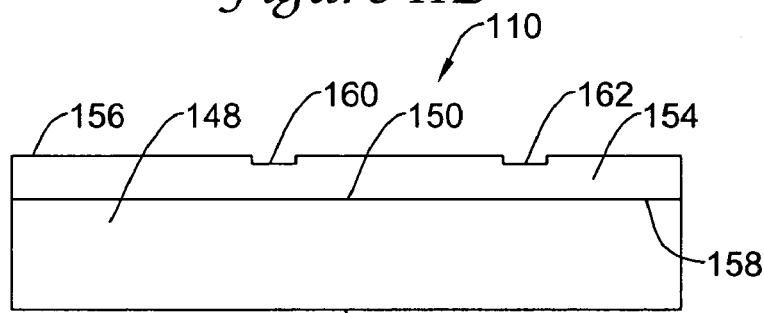

FIG. 11F illustrates a step of pre-thinning a portion of the first surface 156 of layer 154 later used to form the moving comb fingers. Using a suitable etching technique such as Deep Reactive Ion Etching (DRIE), a number of trenches 160,162 can be formed in the first surface 156 of the layer 154. The depth of the trenches 160,162 can correspond to the amount that the comb fingers are to be thinned, similar, for example, to the $\Delta T_2$ dimension illustrated above with respect to FIG. 8. In certain embodiments, for example, the trenches 160,162 can have a depth in the range of about 0.25 microns to 4 microns, and more specifically, about 1 micron to 2 microns. As shown in FIG. 11F, the trenches 160,162 only extend into a shallow portion of the first surface 156 of the layer 154, and thus do not penetrate through the layer 154 or into the wafer 148.

Figure 11G:
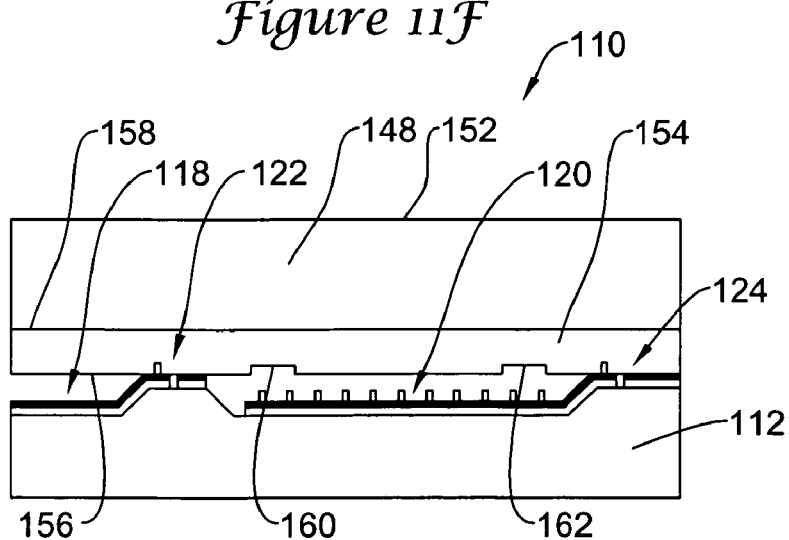

Once the pre-thinning step is performed, the etched wafer 148 is then flipped or inverted such that the first surface 156 of the layer 154 is positioned on top of the mesas 122,124 so as to overhang the recesses 118,120 formed in the glass handle wafer 112. As shown in FIG. 11G, the etched wafer 148 and glass handle wafer 112 can then be bonded together using a suitable bonding process such as anodic bonding, wherein the two members are heated at an elevated temperature of about 250° C. to 550° C. and then bonded together by applying a voltage between the two members. Other suitable bonding processes such as heat bonding, adhesives, etc. can also be used to bond the two members together, if desired.

Figure 11H:
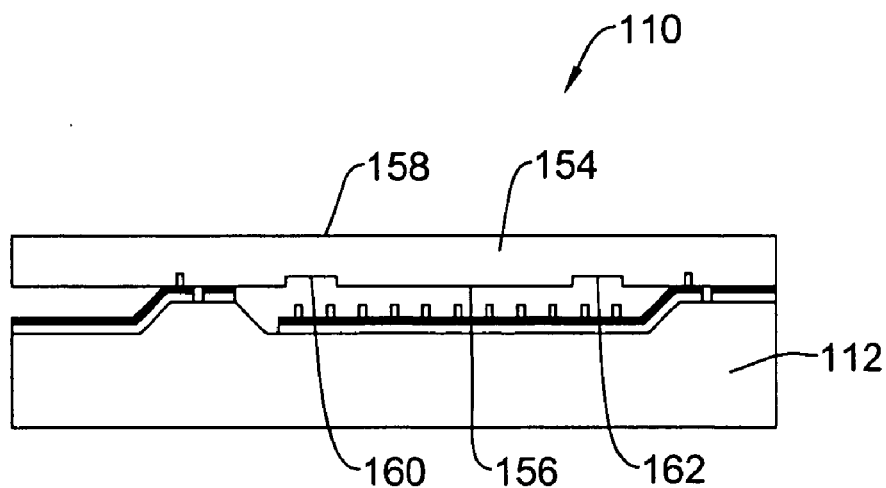

Once bonded together, the wafer 148 can then be removed by grinding away the wafer 148 material, or by an etching process configured to selectively etch the wafer 148 material, leaving intact the layer 154 material, as shown, for example, in FIG. 11H. In those embodiments in which the wafer 148 is removed via an etching process, the heavily doped epitaxial layer 154 can be configured to act as an etch stop to help prevent further etching of the epitaxial layer 154 from occurring.

Figure 11I:
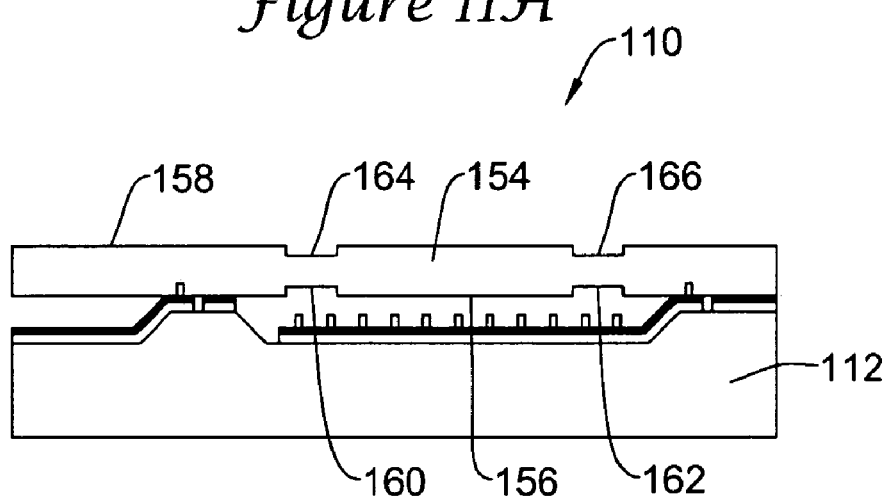

Once the wafer 148 material has been removed, a subsequent etching step may then be performed to thin down portions of the second surface 158 of the layer 154, forming the reduced thickness region for the top portion of the moving comb fingers. As shown in FIG. 11I, for example, a number of trenches 164,166 can be formed in the second surface 158 of the layer 154. The depth of the trenches 164,166 can correspond to the amount that the top portion of the comb fingers is to be thinned, similar to the $\Delta T_1$ dimension described above with respect to FIG. 8. In certain embodiments, the depth of the trenches 164,166 can be similar to the depth of the trenches 160,162 formed in the first surface 156 of the layer 154. In some embodiments, for example, the trenches 164,166 can have a depth in the range of about 0.25 microns to 4 microns, and more specifically 1 micron to 2 microns. As with the trenches 160,162 described above with respect to FIG. 11F, the trenches 164,166 only extend into a shallow portion of the first surface 156 of the layer 154, and thus do not penetrate through the layer 154 or into the wafer 148.

Figure 11J:
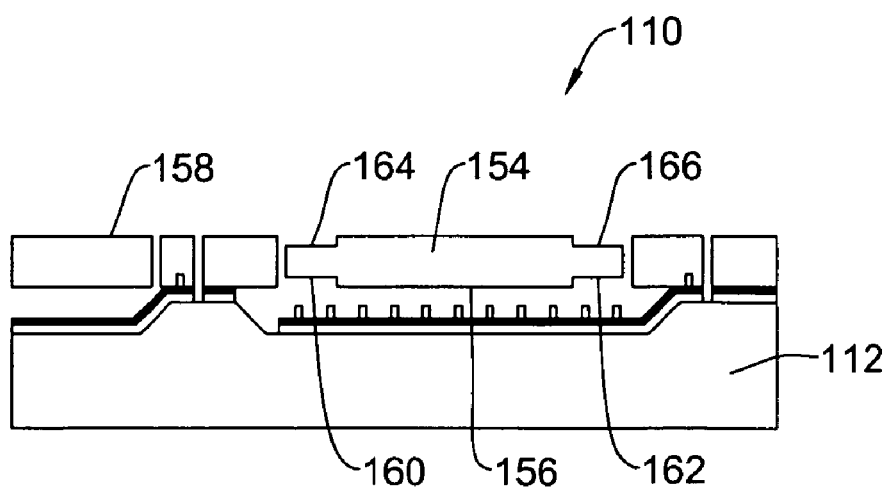

FIG. 11J illustrates a subsequent step of selectively etching the layer 154 to form the comb drive members, proof mass, suspension beams, as well as other components of the comb drive device. A suitable wet or dry etching process can be performed using photolithography techniques to selectively etch through various locations of the layer 154. A photomask or cap layer (not shown) can be used to help prevent etching of those portions of the layer 154 forming the microstructures, including, for example, the trenches 160,162,164,166 used to form the thinned portion of the moving comb fingers.

As can be seen, the various comb drive elements may be etched after layer 154 is bonded to the glass handle wafer 112. Because only the trenches 160,162,164,166 are formed at this point, and because these trenches 160,162,164,166 are relatively shallow, the top surface of layer 154 is still relatively flat. Having a relatively flat top surface of layer 154 may help when applying the photomask or cap layer (not shown) that is used to define the various comb drive elements and/or other microstructures. For example, a relatively flat top surface of layer 154 may make it easier to apply a uniform photomask or cap layer, which may assist in more precisely patterning the various comb drive elements and/or other microstructures using photolithography techniques.

FIGS. 12A-12I are schematic representations of a method 168 of fabricating a comb drive device in accordance with another illustrative embodiment of the present invention. Method 168 may be similar to that described above with respect to FIGS. 11A-11J, but may include an additional step of adding a metal layer to selective portions of the layer formed on the wafer substrate. Beginning with FIG. 12A, a wafer 170 having a first surface 172 and a second surface 174 can be provided as a sacrificial substrate. In a subsequent step illustrated in FIG. 12B, an epitaxial layer 176 of boron-doped silicon or other suitable material having a first surface 178 and a second surface 180 can be grown on the first surface 172 of the wafer 170, similar to that described above with respect to FIG. 11E.

Figure 12A:
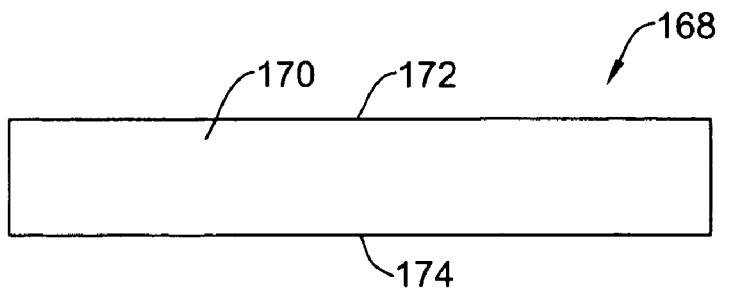
FIGS. 12A-12I are schematic representations of a method of fabricating a thin comb MEMS device in accordance with another illustrative embodiment of the present invention.
Figure 12B:
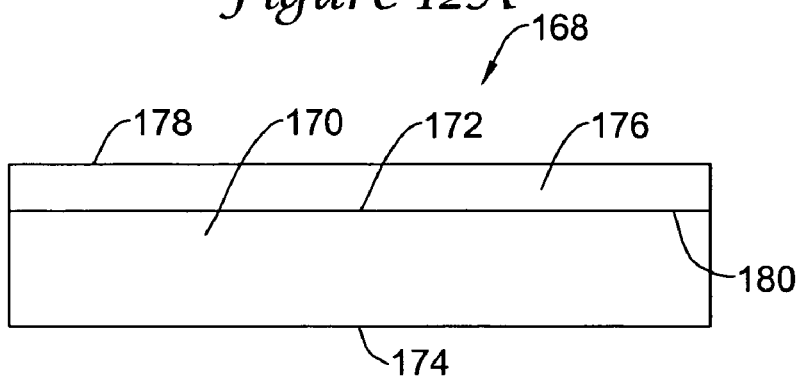
Figure 12C:
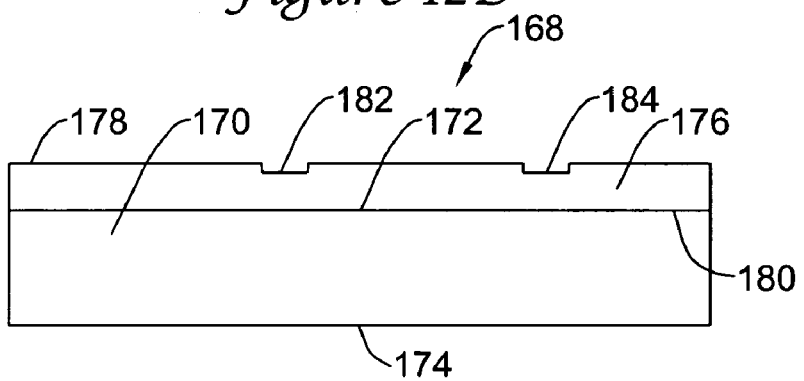

FIG. 12C illustrates the step of thinning down a portion of the first surface 178 of the layer 176, similar to that described in FIG. 11F described above. A number of trenches 182,184 can be formed in the first surface 178 of the layer 176, which as discussed herein, can correspond to the amount that the comb fingers are to be thinned. The trenches 182,184 only extend into a shallow portion of the first surface 178 of the layer 176, and thus do not penetrate through the layer 176 or into the wafer 170.

Figure 12D:
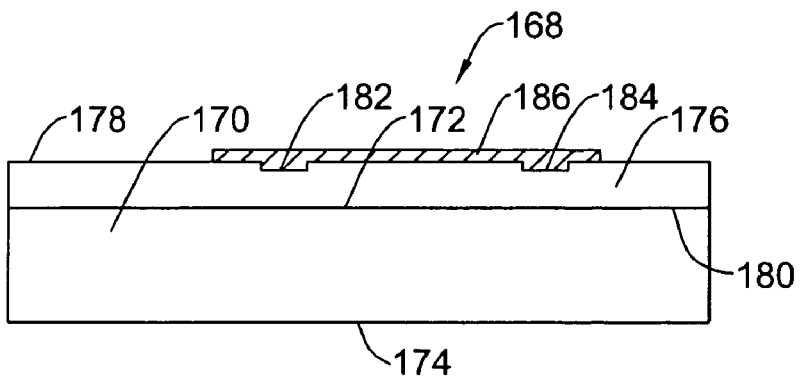

FIG. 12D illustrates the step of forming a metal layer 186 over the trenches 182,184 and at least a portion of the first surface 178 of the layer 176. The metal layer 184 may be deposited or otherwise formed on the layer 174 using conventional methods in the art, and can include a material different than the material forming the conductive traces on the glass handle wafer 112. In one illustrative embodiment, for example, the metal layer 184 may include chromium, although other metals or metal alloys may be used. The metal layer 186 can be dimensioned to fit within the recesses 118,120 of the glass handle wafer 112, allowing the wafer 170 and layer 176 to be bonded to the glass handle wafer 112 in a manner similar to that described above with respect to FIG. 11G.

Figure 12E:
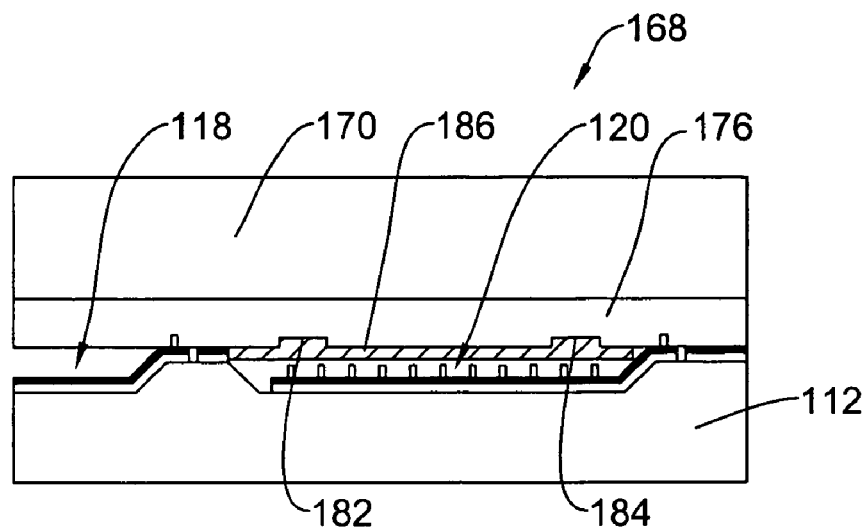
Figure 12F:
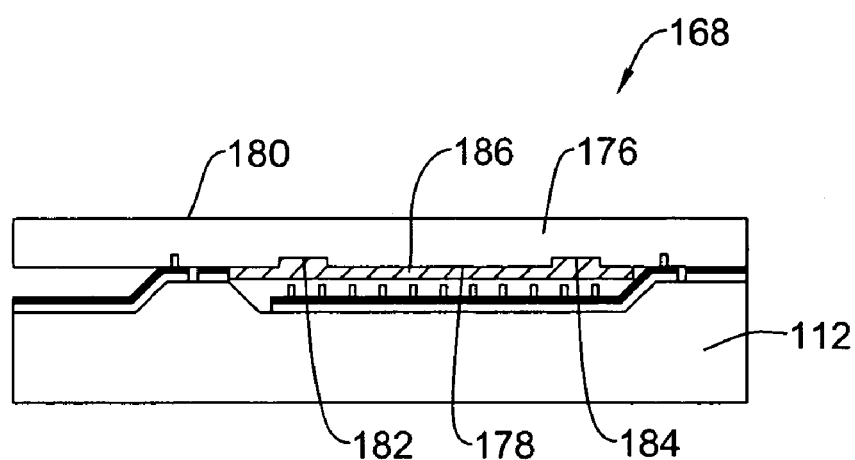

FIG. 12E illustrates the step of bonding of the layer 176 to the glass handle wafer 112 formed in the steps previously described with respect to FIGS. 11A-11C above. As shown in FIG. 12E, the wafer 170 can be flipped or inverted such that the first surface 178 of the layer 176 is positioned on top of the mesas 122,124 of the glass handle wafer 112. The wafer 170 and glass handle wafer 112 can then be bonded together using a suitable bonding process such as anodic bonding, heat bonding, adhesives, etc. The wafer 170 material can then be removed by grinding, etching or other suitable process.

Figure 12G:
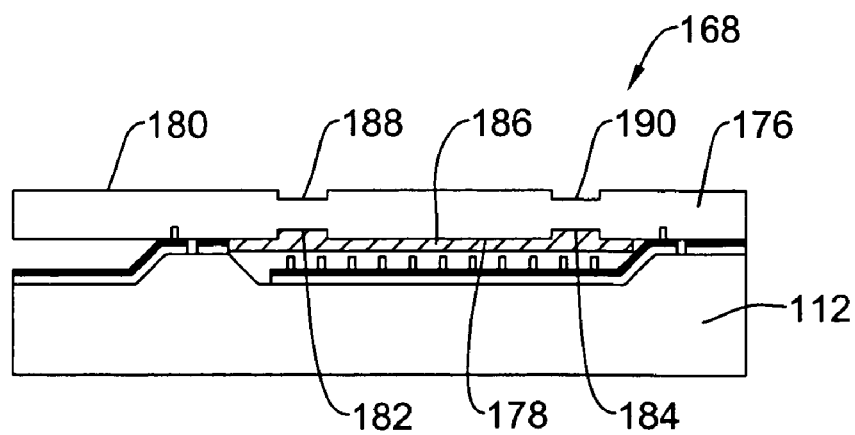

Once the wafer 170 material has been removed, a subsequent etching step may then be performed to thin down portions of the second surface 180 of the layer 176, forming the reduced thickness region for the top portions of the moving comb fingers. As shown in FIG. 12G, for example, a number of trenches 188,190 can be formed in the second surface 180 of the layer 176. As with the trenches 182,184 described above with respect to FIG. 12C, the trenches 188,190 only extend into a shallow portion of the second surface 180 of the layer 176, and thus do not penetrate through the layer 176 or into the wafer 170.

Figure 12H:
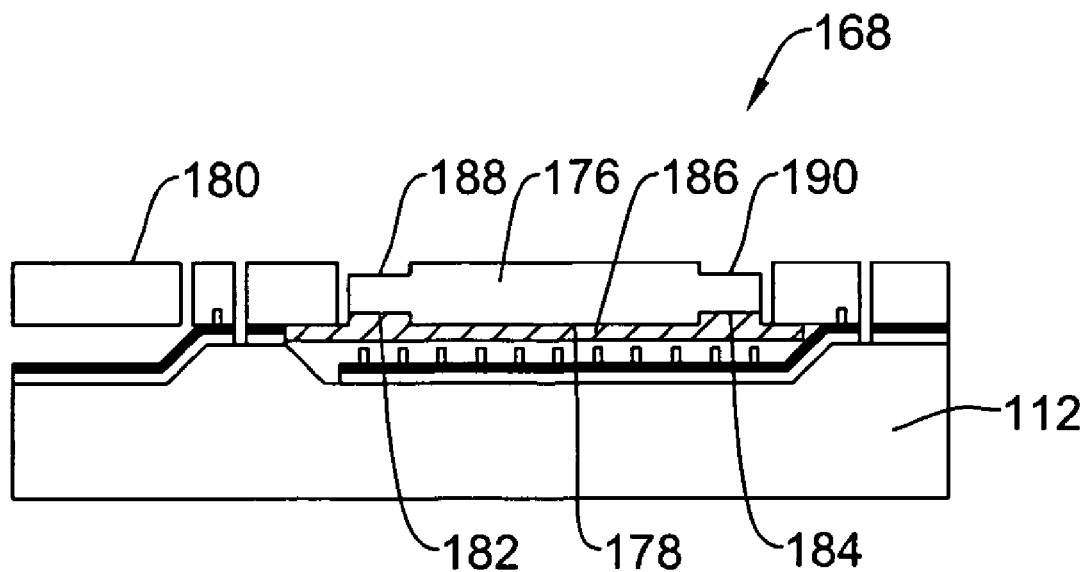

FIG. 12H illustrates a subsequent step of selectively etching the layer 176 to form the comb drive members, proof mass, suspension beams, as well as other components of the comb drive device. Standard lithography techniques can be used to form the pattern of recesses, channels, and holes formed in the layer 176, which can then be selectively etched with an etching process that etches the layer 176 and not the metal layer 186. During this step, the addition of the metal layer 186 acts as an etch stop to help prevent the etchant from further etching the thinned down portions of the moving comb fingers.

In certain processes, the application of the metal layer 186 can provide sharper feature definition at the interface of the layer 176 and the metal layer 186. In addition, the metal layer 186 can act as a seal or barrier to help prevent gasses from escaping into the atmosphere during the etching process. This may be significant in certain etching processes such as a DRIE etching process, which relies at least in part on the gas composition of the surrounding atmosphere. In such cases, the release of gas (e.g. oxygen) collected within the recesses during the bonding process can limit the effectiveness or controllability of the etching process.

Figure 12I:
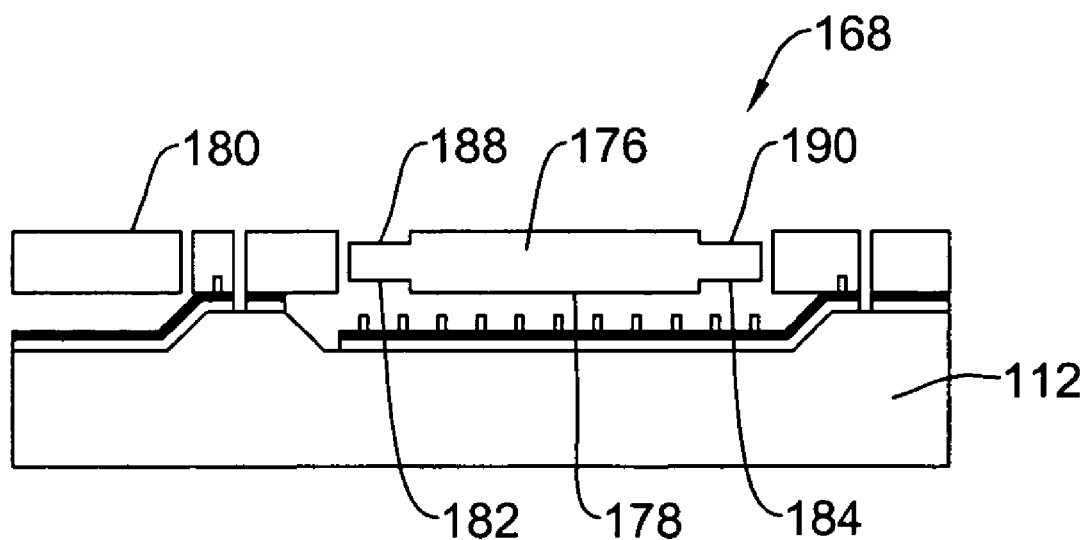

FIG. 12I is a schematic view illustrating the layer 176 and glass handle wafer 112 once the metal layer 186 has been removed. The metal layer 186 can be removed from the recesses using techniques well known to those of skill in the art. In one illustrative embodiment, for example, an etchant capable of removing the metal layer 186 but not the layer 176 can be applied within the recesses, causing the metal layer 186 to selectively dissolve. The etchant can be capable of selectively removing the metal layer 186 but not the conductive layers forming the metal electrodes and/or conductive traces on the glass handle wafer 112.

While the illustrative embodiments described above with respect to FIGS. 11-12 employ the use of epitaxial layers to form the various drive elements of the comb drive device, it should be understood that other methods and/or techniques can be implemented, if desired. As described above, and in one illustrative embodiment, a Silicon-On-Insulator (SOI) technique can be used to form the various elements of the comb drive device, including the thinned comb fingers. Alternatively, in a layer transfer technique, a thin layer of silicon, often only a few microns thick, can be provided on a donor substrate. The thin layer of silicon can then be separated from the donor substrate, and attached to the glass handle wafer using layer transfer techniques known in the art. The formation of the thinned comb fingers as well as other elements of the comb drive device can be accomplished using any number of suitable techniques.

Having thus described the several embodiments of the present invention, those of skill in the art will readily appreciate that other embodiments may be made and used which fall within the scope of the claims attached hereto. Numerous advantages of the invention covered by this document have been set forth in the foregoing description. It will be understood that this disclosure is, in many respects, only illustrative. Changes may be made in details, particularly in matters of shape, size and arrangement of parts without exceeding the scope of the invention.

What is claimed is:

1. A comb drive device, comprising:
   a first number of comb fingers each having a top surface, a bottom surface, and a thickness defined by the distance between the top and bottom surfaces;
   a second number of comb fingers each having a top surface, a bottom surface, and a thickness defined by the distance between the top and bottom surfaces, said second number of comb fingers being spaced apart from and interdigitated with said first number of comb fingers;
   wherein the thickness of at least a portion of the second number of comb fingers is less than the thickness of at least a portion of the first number of comb fingers; and
   wherein the second number of comb fingers each have a first region with a first thickness that transitions to a second region with a second thickness that is less than the first thickness.

2. The comb drive device of claim 1, wherein said first number of comb fingers comprises one or more stationary comb fingers.

3. The comb drive device of claim 1, wherein said second number of comb fingers comprises one or more moving comb fingers.

4. The comb drive device of claim 3, wherein the moving comb fingers are configured to move in a substantially horizontal direction during actuation.

5. The comb drive device of claim 1, wherein each of the second number of comb fingers defines a length, and the first region with the first thickness transitions to the second region with the second thickness at an abrupt transition point along the length.

6. The comb drive device of claim 1, wherein the first region with the first thickness transitions with a taper to the second region with the second thickness.

7. The comb drive device of claim 1, wherein the top and bottom surfaces of the second number of comb fingers are configured to remain between horizontal planes defined by the top and bottom surfaces of the first number of comb fingers during actuation.

8. The comb drive device of claim 1, further comprising an overlapping region between each adjacent interdigitated comb finger.

9. The comb drive device of claim 8, wherein the thickness of each of the second number of comb fingers is less than the thickness of the first number of comb fingers at said overlapping region.

10. The comb drive device of claim 1, wherein said first number of comb fingers are coupled to a comb drive member.

11. The comb drive device of claim 10, wherein said second number of comb fingers are coupled to a proof mass.

12. The comb drive device of claim 1, wherein said first number of comb fingers are coupled to a proof mass.

13. The comb drive device of claim 12, wherein said second number of comb fingers are coupled to a comb drive member.

14. The comb drive device of claim 11, further comprising an underlying support substrate adapted to freely support the proof mass thereabove.

15. The comb drive device of claim 11, further comprising a suspension member operatively coupled to the proof mass.

16. The comb drive device of claim 1, wherein said comb drive device is an electrostatic comb drive device.

17. The comb drive device of claim 1, wherein said comb drive device is a gyroscope.

18. The comb drive device of claim 1, wherein said comb drive device is an accelerometer.

19. The comb drive device of claim 1, wherein said comb drive device is a Steered Agile Beam module.

20. A comb drive device, comprising:
a comb drive member including a first plurality of comb fingers each having a top surface, a bottom surface, and a thickness defined between the top and bottom surfaces;
a proof mass including a second plurality of comb fingers each having a top surface, a bottom surface, and a thickness defined between the top and bottom surfaces, said second plurality of comb fingers being spaced apart from and interdigitated with the first plurality of comb fingers to form an overlapping region between each adjacent interdigitated comb finger;
wherein the thickness of at least a portion of the second plurality of comb fingers is less than the thickness of the first plurality of comb fingers; and
wherein the second plurality of comb fingers each have a first region with a first thickness that transitions to a second region with a second thickness that is less than the first thickness.

21. The comb drive device of claim 20, wherein said first plurality of comb fingers are stationary comb fingers.

22. The comb drive device of claim 20, wherein said second plurality of comb fingers are moving comb fingers.

23. The comb drive device of claim 22, wherein the moving comb fingers are configured to move in a substantially horizontal direction during actuation.

24. The comb drive device of claim 20, wherein each of the second plurality of comb fingers defines a length, and the first region with the first thickness transitions to the second region with the second thickness at an abrupt transition point along the length.

25. The comb drive device of claim 20, wherein the first region with the first thickness transitions with a taper to the second region with the second thickness.

26. The comb drive device of claim 20, wherein the top and bottom surfaces of the second plurality of comb fingers are configured to remain within horizontal planes defined by the top and bottom surfaces of the first plurality of comb fingers during actuation.

27. The comb drive device of claim 20, wherein the thickness of each of the second plurality of comb fingers is less than the thickness of the first plurality of comb fingers at said overlapping region.

28. The comb drive device of claim 20, further comprising an underlying support substrate adapted to freely support the proof mass thereabove.

29. The comb drive device of claim 20, further comprising a suspension member operatively coupled to the proof mass.

30. The comb drive device of claim 20, wherein said comb drive device is an electrostatic comb drive device.

31. The comb drive device of claim 20, wherein said comb drive device is a gyroscope.

32. The comb drive device of claim 20, wherein said comb drive device is an accelerometer.

33. The comb drive device of claim 20, wherein said comb drive device is a Steered Agile Beam module.

34. A comb drive device, comprising:
a plurality of stationary comb fingers each having a top surface, a bottom surface, and a thickness defined between the top and bottom surfaces;
a plurality of moving comb fingers each having a top surface, a bottom surface, and a thickness defined between the top and bottom surfaces, said plurality of moving comb fingers being spaced apart from and interdigitated with said plurality of stationary comb fingers;
wherein the thickness of at least a portion of said plurality of moving comb fingers is less than the thickness of said plurality of stationary comb fingers; and
wherein the moving comb fingers each have a first region with a first thickness that transitions to a second region with a second thickness that is less than the first thickness.

35. A comb drive device, comprising:
a stationary comb drive member including a first plurality of comb fingers each having a top surface, a bottom surface, and a thickness defined between the top and bottom surfaces;
a moving proof mass including a second plurality of comb fingers each having a top surface, a bottom surface, and a thickness defined between the top and bottom surfaces, said second plurality of comb fingers being spaced apart from and interdigitated with the first plurality of comb fingers to form an overlapping region between each adjacent interdigitated comb finger;
wherein the thickness of at least a portion of the second plurality of comb fingers is less than the thickness of the first plurality of comb fingers at the overlapping region; and
wherein the second plurality of comb fingers each have a first region with a first thickness that transitions to a second region with a second thickness that is less than the first thickness.

36. A comb drive device, comprising:
a plurality of stationary comb fingers each having a top surface, a bottom surface, and a thickness defined between the top and bottom surfaces;
a plurality of moving comb fingers each having a top surface, a bottom surface, and a thickness defined between the top and bottom surfaces, said plurality of moving comb fingers being spaced apart from and interdigitated with said plurality of stationary comb fingers;
wherein the thickness of at least a portion of said plurality of stationary comb fingers is less than the thickness of said plurality of moving comb fingers; and
wherein the stationary comb fingers each have a first region with a first thickness that transitions to a second region with a second thickness that is less than the first thickness.

37. A comb drive device, comprising:
a plurality of stationary comb fingers each having a top surface, a bottom surface, and a thickness defined between the top and bottom surfaces;

a plurality of moving comb fingers each having a top surface, a bottom surface, and a thickness defined between the top and bottom surfaces, said plurality of moving comb fingers being spaced apart from and interdigitated with said plurality of stationary comb fingers;

wherein each of said plurality of moving comb fingers defines a length, and wherein the thickness of each of said plurality of moving comb fingers is reduced along a portion of the length such that the moving comb fingers each have a first region with a first thickness that transitions to a second region with a second thickness that is less than the first thickness.

* * * * *